Sept. 1, 1925.

J. REECE ET AL 1,551,692

MECHANICAL POWER TRANSMISSION

Filed Feb. 21, 1923   3 Sheets-Sheet 1

John Reece &
F. A. Reece
Inventors,
by Rogers, Kennedy & Campbell,
Attorneys.

Sept 1, 1925. 1,551,692
J. REECE ET AL
MECHANICAL POWER TRANSMISSION
Filed Feb. 21, 1923 3 Sheets-Sheet 2

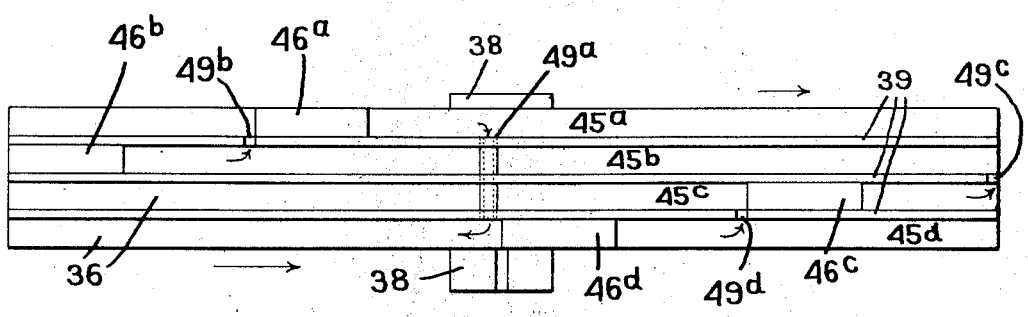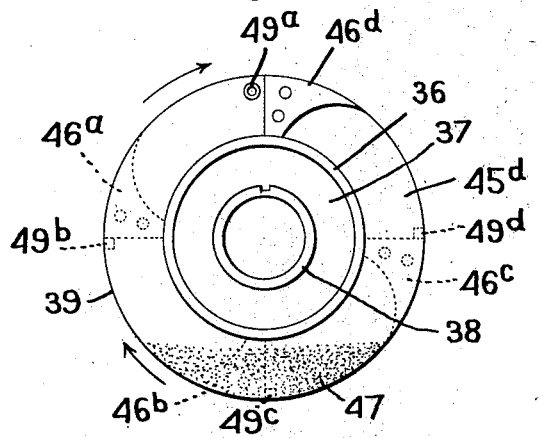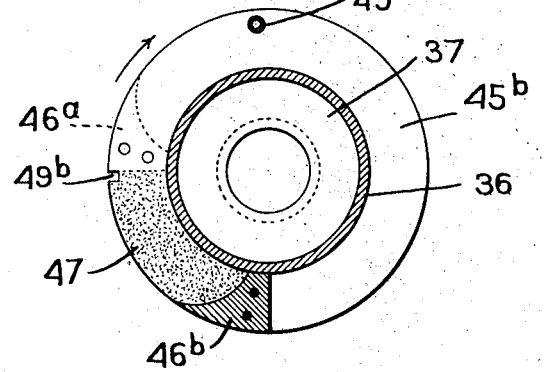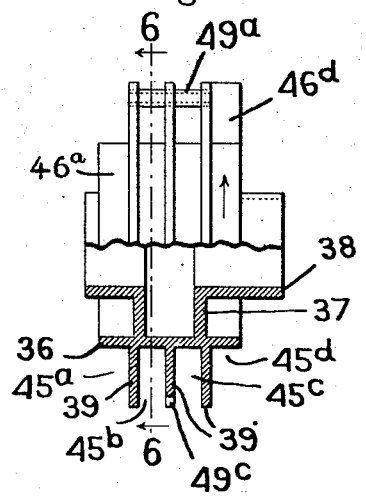

Patented Sept. 1, 1925.

1,551,692

UNITED STATES PATENT OFFICE.

JOHN REECE, OF BOSTON, AND FRANKLIN A. REECE, OF BROOKLINE, MASSACHUSETTS, ASSIGNORS TO REECE TRANSMISSION COMPANY, OF BOSTON, MASSACHUSETTS, A CORPORATION OF MAINE.

MECHANICAL-POWER TRANSMISSION.

Application filed February 21, 1923. Serial No. 620,468.

*To all whom it may concern:*

Be it known that we, JOHN REECE and FRANKLIN A. REECE, citizens of the United States, residing at Boston and Brookline, respectively, in the counties of Suffolk and Norfolk and State of Massachusetts, have invented certain new and useful Improvements in Mechanical-Power Transmission, of which the following is a specification, reference being had therein to the accompanying drawing.

This invention relates to mechanical power transmission and involves a novel method and apparatus for transmission of mechanical power, adapted to use in various situations and for various purposes where the speed ratio is required to be varied or adjusted, for example, as a part of the transmission of motor vehicles, or any analogous use where the load is variable and it is desired to alter the speed ratio or torque ratio to correspond.

The invention is herein shown applied to the motor vehicle type of transmission, especially to a motor vehicle driven by internal combustion engine through a fly wheel, the engine itself controlled by throttle. As is well known such engines do not generate power efficiently except at their higher speeds and while a given engine might be run, for example, as low as 150 R. P. M. or as high as ten times that rate or more, this would not be sufficient for the purposes of varying the speed or the torque to meet practical conditions. The main object of the present invention is to afford a successful mechanism to meet these requirements, and especially one which will be automatic, for a given throttle adjustment, so that as conditions of load may change the mechanism will itself afford different ratios of speed, accompanied by inverse ratios of torque, without the need of manual attention, or engaging or disengaging of mechanism, or shifting of gears, or the like.

A specific object is to utilize in a practical manner the action of centrifugal force as an element in the self-adjusting transmission of power, by means of a mass or masses carried around with the driver, that is to say the engine shaft or fly wheel, and taking part in the transmission. The use of centrifugally operating masses has heretofore been suggested and we have heretofore filed application for embodiments of this principle, for example, Serial Number 364,897, filed March 11, 1920. The mass is movably arranged on the driving parts so that it can be moved nearer to the axis thereof, opposed by its centrifugal force, which force therefore is constantly present as an actively pulling force and of substantial strength, indeed this force increasing as the square of the driving speed, being extremely powerful with the higher speeds. In combination with such mass or masses are embodied gears or other connections extending to the driven shaft and of such nature that whenever there is a difference in rotary speed between the driving and driven parts, this constituting a relative rotation, the driven shaft turning slower than the driving, the mass is compelled to move inward toward the axis of rotation. The resulting action is, that as the driven shaft load resists rotation with a certain force or drag, thus tending to draw the centrifugal mass inwardly, the centrifugal force of the mass offers continual resistance to the inward pulling and therefore to the drag on the driven shaft, and in this manner the centrifugal force operates literally to pull the driven shaft forward, delivering torque, derived from the power of the driving shaft, fly wheel and engine. This existing constant centrifugal pull therefore constitutes a vital though invisible transmitting link or connection from the driving to the driven parts; it is non-positive and resilient in action, giving a forcible and almost intelligent self-adjusting transmission of torque. It effects a pull or rotation upon the driven shaft of as high a speed as the available power warrants, but no faster, considering the load to be overcome. It yields to excessive load but merely to the extent of adjusting the speed ratio so that the power is able to overcome the load; the action being in a sense ideal as it is wholly self-acting without requiring coupling, uncoupling or other manual attention. As each mass is preferably a permanent part of the mechanism its inward movement will be succeeded, after it has reached its extreme position, by a return or outward movement, a separate phase of action, the mass thereby returning to a point where it is available for further transmitting action. Whenever the load is not too great for the driven shaft to be driven at the full speed of the driving shaft there will be no substantial inward yield of the mass, and the centrifugal force under these circumstances, operates to hold the mass at an intermediate position, involving no internal movement of the mechanism, the forces being balanced, and the entire mechanism rotating substantially as a rigid unity. While the present invention and the prior application possess these described qualities in common, the prior embodiment possesses certain disadvantages which it is an object of the present invention to overcome. For example, in the said application each centrifugal mass was so connected that in its return or outward phase of movement the tendency of centrifugal force was to rotate the driven parts reversely, cancelling the previous driving effect, and requiring a special expedient, consisting of a device in the nature of a pawl and ratchet, to permit forward and prevent reverse rotation of the driven shaft, with a transmitting spring introduced to steady the intermittent impulses; which features, the pawl and ratchet and transmitting spring, are dispensed with in the present invention.

Other objects and advantages of the present invention will be made clear in the hereinafter following description of one form or embodiment thereof, or will be manifest to those skilled in the art. To the attainment of the objects and advantages mentioned, the present invention consists in the novel transmission of mechanical power, and the novel features of combination, arrangement, mechanism, design, detail, operation and method herein described or claimed.

A feature of the present invention is that the mass or mass portions are not fixed on their carriers or gears, but are free in the sense that while the carrier may force the mass inward against centrifugal force, the mass thereafter cannot in its return movement or outward phase apply its centrifugal force reversely to the carrier. The carrier discharges it and it reaches peripheral position without interaction with the carrier. For example loose weights, or flowing weights, such as portions of liquid may be the masses, these passing through a circuit, in the form of a weight train, the carrier forcing them inward and then discharging them to return outwardly.

In the accompanying drawings Fig. 1 is a central longitudinal vertical section of one form or embodiment of a transmission apparatus illustrating the principles of the present invention.

Fig. 3 is a peripheral development of the planetating carrier or rather of the portions thereof, shown in Figs. 4 and 5.

Fig. 4 is a view corresponding to Fig. 1 of the interior portion of one of the planetating carriers, partly in full view, and partly in central section as in Fig. 1.

Fig. 5 is a right elevation of one of the planetating carriers or units of Figs. 1 or 4, with the cover plates removed.

Fig. 6 is a right elevation of the same taken on the line 6—6 of Fig. 4.

Figure 1:
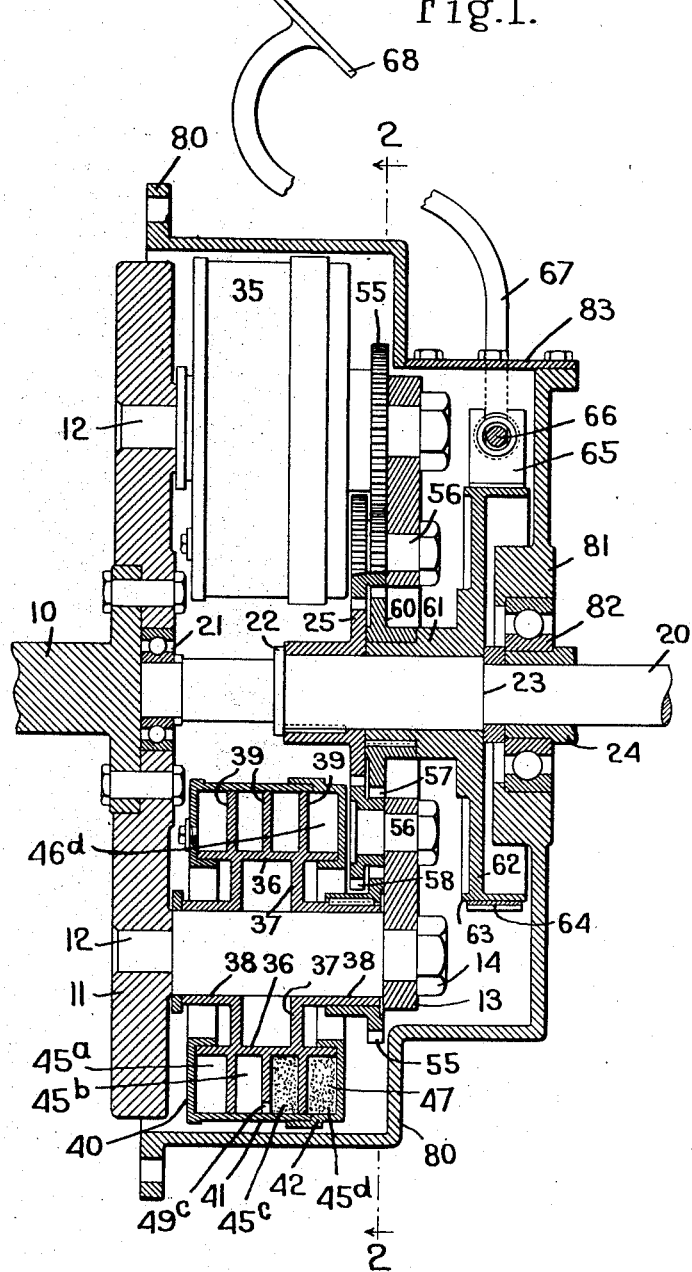

First will be described the "driving" parts of the apparatus, referring to the parts turning rigidly with the engine shaft. The source of power may be an internal combustion engine and this is represented by its shaft 10. Attached to the shaft is a wheel, disk or support 11, which with the mechanism that rotates with it may be considered as the fly wheel, giving the steadying effect of the fly wheel customarily used with such engines.

Preferably the apparatus comprises more than one of the centrifugal or planetary mechanisms, and there are indicated four of them. Each of these is mounted upon the fly wheel disk 11 by means of an eccentrically placed stud 12, and four of these studs will be noticed. The right ends of the four studs are interconnected by a circular plate or enclosing ring 13, the studs and ring being rigidly connected by four nuts 14.

The "driven" parts of the apparatus comprise primarily the driven shaft 20, having a bearing 21 between its left end and the fly wheel, the driven and driving shafts, being preferably in alinement. The driven shaft is shown as formed with a collar 22 at an interior point and further to the right a shoulder 23, these serving to receive the pressure of parts bearing against them. The driven shaft may be considered as having connections extending further to the right and eventually to the wheels of a vehicle, and a portion 24 of a universal joint is indicated, this sometimes constituting a portion of the flexible rearward connections. In addition to the described parts the driven shaft has keyed to it a central gear 25, cooperating with the planetating actions to be described. This completes the description of the driving and driven parts, and the planetating parts will next be described.

Four planetating carriers 35 are herein shown and these may be identical in construction. The characteristics of these carriers are novel, but in one sense may be considered as a development of the planetating carriers of a companion application, filed February 21, 1923, Serial No. 620,467. In the companion application the carrier comprises a rotating casing affording an annular chamber in which the flowing mass or mercury is loosely contained, the carrier having a number of vanes or pockets projecting into this annular space and each pocket engaging a quantity of the mass so as to carry it inward and discharge it. The pockets or vanes are distributed around the periphery of the annular space so that a number of them is always in action. With the present carrier there are a plurality of annular chambers or spaces, four being shown, with loose masses in each, but there is only a single vane or pocket in each chamber. There are thus a plurality of pockets or vanes, one for each annular space, and these four vanes are set 90° apart so that the action of the vane in one annular space will be succeeded by that in the succeeding one and so forth. By this arrangement when any pocket discharges its mass the mass is not required to find its way past a number of obstructing vanes in order to return to outward position. In the companion case the vanes were made collapsible or hinged for this purpose. In the present case each vane may be a rigid member in the nature of a scoop, entirely filling the cross section of the annular chamber and forming a pocket which necessarily picks up the total supply of flowing mass contained in the chamber.

Each carrier may be built up somewhat as follows. The description may be conveniently begun with the cylindrical portion 36. From this extend inwardly a pair of webs 37, the inward ends of which are turned outwardly in the form of flanges or hubs 38, which engage directly on the studs 12 mounted on the fly wheel, as before mentioned. The cylinder 36 is also formed with outwardly extending annular walls or partitions 39, which constitute the divisions between the annular chambers, already mentioned. These parts are best shown in Figs. 1 and 4 and Fig. 1 further shows the following enclosing members. A left hand annular cap piece 40 is formed with a cylindrical extension or wall 41 and cooperating with these is the opposite or right hand annular cap 42; these three pieces being permanently and rigidly held in place, as shown, so as to tightly enclose the chambers of the carrier. The flowing weights or masses of course will be first introduced through the filling plugs, not numbered, shown in Fig. 1.

It will thus be seen that the cap pieces 40 and 42 and the partition walls 39 afford four annular chambers, which may be distinguished as the left hand chamber $45^a$, the second chamber $45^b$, the third chamber $45^c$ and the right hand chamber $45^d$. The shape of the vanes or scoops in their respective chambers is best shown in Fig. 5 and these, according to the chambers in which they are located, may be designated as the left hand vane $46^a$, the second vane $46^b$, the third vane $46^c$ and the right hand or fourth vane $46^d$, which last mentioned is seen in full lines in Fig. 5, the others in dotted lines. The flowing mass 47 may be a liquid such as mercury, heretofore suggested, or a mass of small steel balls or shot moving in oil.

Figure 2:
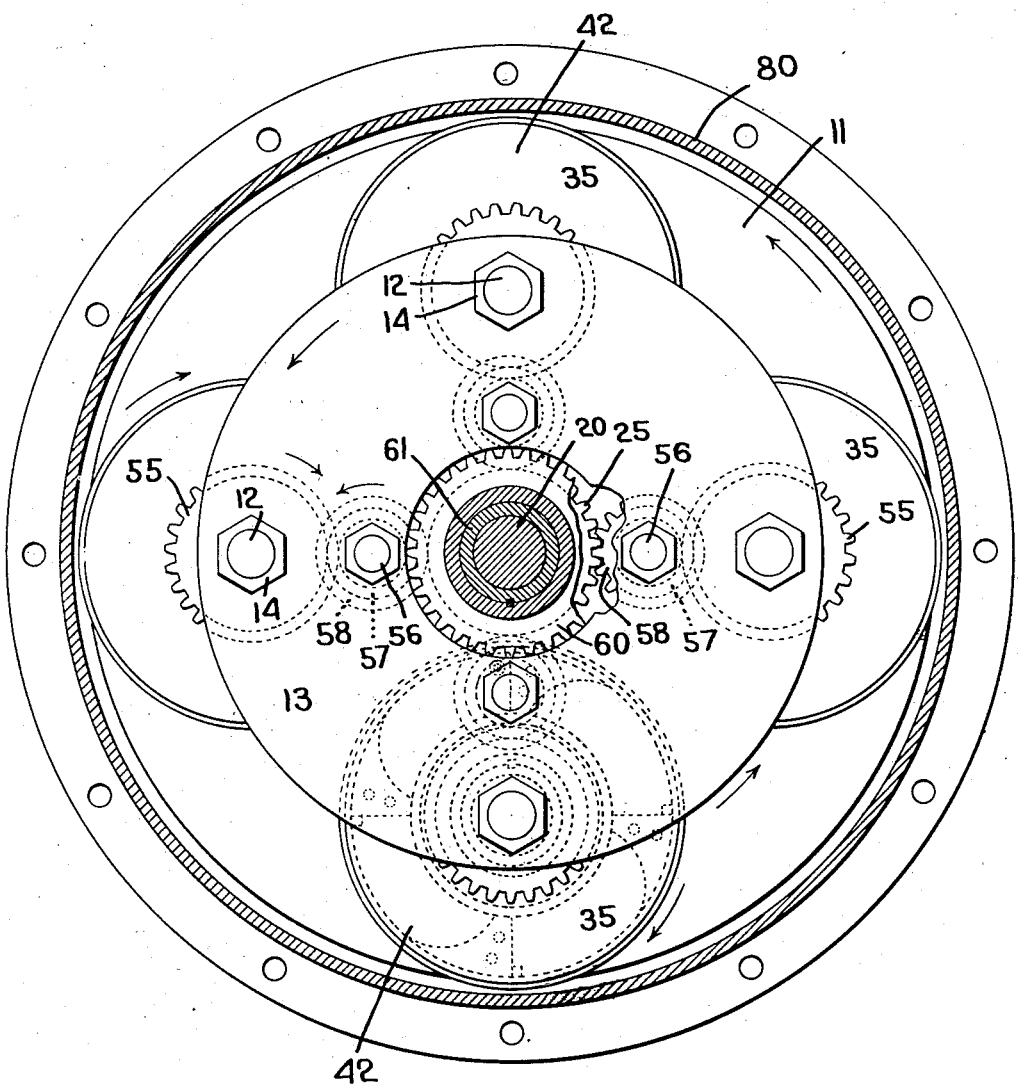
Fig. 2 is right elevation partly in transverse section on the line 2—2 of Fig. 1.

The direction of motion of the carrier and the scoops is indicated by the arrows. Referring to Fig. 2 the fly wheel 11 and disk 13 should be considered as rotating counter-clockwise, as shown. Each of the carriers 35 will then rotate clockwise, as indicated. This same direction is indicated in Figs. 5 and 6 and the action of the vanes on the flowing masses will thus be understood. Thus, in Fig. 5 the vane $46^d$ has discharged the mass 47, which is shown at the lower side awaiting the continued rotation of the vane to again pick up the mass and force it inwards. In Fig. 6 the vane $46^b$ is indicated in full lines, it having engaged the mass and started its inward movement. It will be understood that in Figs. 5 and 6 the carrier is supposed to correspond with the one indicated at the lower side of Fig. 2, so that the lowest portion of the carrier is at the most peripheral point of the general system.

The development in Fig. 3 indicates the periphery of the carrier shown in Figs. 5 and 6 and from this will readily be seen the relation of the partition walls 39 and the vanes $46^a$ to $46^d$. This diagram also shows a feature of interconnecting passages between the several annular chambers by which the flowing masses may pass from one chamber to another by way of adjustment or equalization, without interfering with the transmitting actions described. These passages are also indicated in the other figures. Thus, from the chamber $45^a$ is shown a passage $49^a$ leading to the chamber $45^d$, any material flowing through this passage being delivered into chamber $45^d$ just behind the vane $46^d$. An analogous passage $49^b$ extends from chamber $45^b$ to chamber $45^a$ just behind the vane $46^a$. The passage $49^c$ similarly extends from chamber $45^c$ to chamber $45^b$. The fourth passage $49^d$ extends from chamber $45^d$ to chamber $45^c$. If there is a surplus of mass in any chamber the tendency will be for this to pass into the other chambers and equalize the action. Thus, in Fig. 6 it will be seen that the vane $46^b$, forcing the mass 47 inwardly, applies a pressure which will cause a part of the mass to flow laterally through the passage $49^b$ into the chamber $45^a$. There may be a certain flow in this way from chamber to chamber in rotation, with the equalizing effect, already mentioned.

These interconnecting passages between the several annular chambers or channels of each of the carriers are not essential to the principles of this invention. Indeed the flowing nature of the described mass is not essential since any mass that can be engaged by the vane in each chamber and forced inwardly and then released to move freely outward would embody the principles. If a solid weight were used the chamber would be merely a guide and any other guiding means would be an equivalent. In any embodiment it will be noted that the centrifugal force of each mass is active during its inward movement to effect transmission of torque while on the return or outward movement the mass is unable to apply a reverse force to the carrier, which reverse force, in certain prior structures, compelled the introduction of a pawl and ratchet to prevent the cancelling, in the second or outward phase of movement, of the driving action produced in the first or inward phase. At the same time the present case does not require an endless train of masses in the sense of the companion case, before referred to, where the entire centrifugal mass in each carrier was contained in a single channel and was required to be forced inwardly in fractional portions. The free mass in each of the chambers of the present case is moved bodily inward in each action and then moves itself bodily outward, a far simpler operation, and the pulsating effect which might otherwise be produced is avoided by the employment of a series of four or different number of separate channels, the vanes and masses in the respective chambers being timed to operate in alternation or succession so as to maintain substantially continuous transmitting action.

Now will be described the connections for causing the planetating rotation of the carriers. The construction is the same for all of the carriers and will be described in connection with one of them. Toothed wheels or gears are the preferable means of connection between each carrier and the driven shaft. The central gear 25 on the driven shaft has already been mentioned and a planetating gear 55 will be observed keyed to the sleeve or hub 38 of the carrier. These two gears 25 and 55 might be directly engaged, as in said companion case, with the result that the direction of planetary rotation would be the same as the direction of fly wheel rotation, as in said companion case. It is preferred, however, to give a reverse direction of the planetation as it is found that this gives a much more effective transmission of torque. Such a connection might be made in various ways, for example, by a sprocket chain around the gears 25 and 55, but in lieu thereof is shown a suitable gear connection, as will be described. The ring 13 which is rigid with the fly wheel, is shown as having, for each carrier, a stud 56 carrying a double pinion 57, 58, the smaller portion of which 57, is in engagement with the planet gear 55. The other pinion 58 is in engagement with the driven shaft central gear 25. By this arrangement the desired reversal of planetary rotation is effected. This feature however is not herein claimed per se, but only in the particular association herein illustrated, as the feature is the sole invention of John Reece and claimed in copending application Serial Number 672,508, filed November 3, 1923.

To understand the action the driven shaft and central gear may be assumed to be stationary while the fly wheel is turning. Referring to Fig. 2 the rotating systems are traveling counterclockwise. The intermediate planetating pinion 58, traveling around the central gear, rotates counterclockwise. The connected planetating pinion 57 transmits the rotation to the planet gear 55, which therefore rotates clockwise, the carrier 35 receiving the same motion.

Before a further description of the operation there will be described certain connections for effecting a reverse direction of driven shaft rotation. The planetating pinion 57 is shown engaging a central gear 60, which is keyed to a sleeve 61 loose on the driven shaft. This sleeve has a web 62 provided with a pulley or rim 63 engaged by a brake or band 64, the purpose of which is to bring the pulley and therefore the gear 60 to rest when desired. Suitable means for tightening the band may be employed. For example, the ends of the band may be formed with lugs 65 engaged by a rod 66, which may be pulled upon by a lever 67 having at its extremity a pedal 68, such that the depression of the pedal tightens the belt and anchors the pulley and gear 60. When this occurs, owing to the relative sizes of the two planetating pinions and the two central gears, the effect will be to cause the gear 25, connected to the driven shaft, to turn in a reverse direction at a fraction of the full speed.

The only illustrated elements not heretofore described comprise a stationary exterior housing 80, the central or hub part 81 of which is provided with a bearing 82 between it and the driven shaft, and a removable plate 83 for giving access to the brake band mechanism.

The action of the present mechanism when adjusted for forward driving need not be described in full detail, as the underlying principles have been made clear in the companion case. When the driven shaft is held stationary or is retarded by its load to a speed less than that of the driving shaft the difference in speeds between the driving and driven shafts effects the planetation of the carriers, as described. Of course, if the driven shaft load is not too great for the existing driving torque the centrifugal action in the carriers may be sufficient to transmit full speed rotation so that all of the parts will turn together in the same direction and v'thout any internal motion. When the load is too great for this the planetation takes effect and the desired result is obtained of the delivery of increased torque to the driven shaft at reduced speed, thus overcoming the load. The four planetating carriers cooperate, but for the purpose of discussing the operation a single carrier may be taken. If there were no masses in the carrier it would planetate freely without operative effect, as the four vanes are balanced. The driven shaft would not be urged forward. Assuming now substantially equal masses of flowing material to be introduced into the four annular channels the centrifugal action takes place, the force being greater as the engine speed is increased, in fact increasing with the square of the speed. It will be assumed that a fair speed and substantial centrifugal force are present in the masses in the four channels. One at a time the four vanes engage the four masses and force them inwardly. The actions, therefore, overlap and there will always be at least two vanes and masses in operation. The operative effect of each vane and mass increase gradually from zero to a miximum and then decreases to zero, as the vane travels from the outermost to the innermost point. Since the action of the several vanes overlaps the net result will be a continuous and practically steady transmission of power. The centrifugal force in each mass as the vane forces it inwardly operates to retard this inward forcing movement. The relative slowness of driven shaft rotation is what causes the planetating rotation and is therefore the factor which causes each vane to force its mass inwardly against the centrifugal force. The centrifugal force pulls directly against this inward forcing action and is thus directly opposed to the drag on the driven shaft. In this way the live force or pull of the centrifugal action is effectively applied to deliver a forward effort upon the driven shaft, at the reduced speed of the latter, the reduced speed being accompanied by a proportional increased torque as with any gearing. There is thus produced a continuous centrifugal force delivering continuous torque to overcome the resistance of the driven shaft, thus complying with the underlying object of the improvement. The action adjusts itself in such a way that the necessary torque will be delivered to the driven shaft and consistent with such torque the greatest possible speed, thus affording a self-maintained balance without any attention by the operator. For example, when an automobile passes to a point of more difficult road conditions it will automatically slow down to the most advantageous speed, thus acquiring the increased force or torque to overcome the conditions. It is to be understood of course that the operator may supplement this automatic adjustment by means of the throttle, opening or closing it to give increase or decrease of torque or speed.

When each mass has been moved completely inwardly it is discharged in the sense that it flows or moves away from the vane and returns itself to its outermost position. On this return movement the mass is actuated by centrifugal force and means have been suggested by which this force might be utilized, but are not illustrated herein because not necessary to the underlying features of the present improvement.

It will be seen that the connections by which the driving force is transmitted from the fly wheel to the driven shaft are not of a positive character but are yielding or resilient in nature, the transmission being both effective and free from irregular action. At low engine speeds the centrifugal force is negligible and there will be no transmission so that by merely slowing down the engine is afforded the same effect as throwing out the usual clutch, thus dispensing with a clutch and its drawbacks. As the engine speed increases the centrifugal force comes more and more into operative effect and actual drive takes place as soon as the transmitted torque exceeds the resistance of the driven shaft. A vehicle can readily be permitted to run down hill freely by merely slowing down the engine and without actual disengagement, the resumption of effective drive being available by the mere opening of the throttle. The frequent speed readjustments and clutching and unclutching operations of prevailing transmission mechanisms are wholly avoided.

It will thus be seen that we have described a power transmission method and apparatus embodying the principles and attaining the objects and advantages of the present invention. Since many matters of construction, arrangement, combination, design and detail may be variously modified without departing from the principles involved, it is not intended to limit the scope of the present invention except in so far as set forth in the appended claims.

What is claimed is:

1. Power transmission apparatus comprising in combination the rotary driving and driven members, a support revolved by the driving member, a planetating carrier mounted on the support, connections from the driven member to the carrier, operative by the speed difference of the driving and driven members, for rotating the carrier, and a plurality of centrifugal masses, said carrier having a number of separate guides for guiding the masses in separate paths, and means to engage and thrust the guided masses inwardly successively.

2. Power transmission apparatus as in claim 1 and wherein the masses are flowing masses, and the guides are separate channels and the means thrusting them inwardly comprises vanes in the respective channels.

3. Power transmission apparatus comprising in combination the driving and driven members, a revolving support turned by the driving member, a plurality of separate centrifugal masses, means carried around on said support for thrusting the several masses inwardly in separate paths, and connections actuated from the driven member for actuating said means.

4. Power transmission apparatus as in claim 3 and wherein the thrusting means comprise a plurality of separate thrusters spaced to act successively and so afford overlapping centrifugal actions and continuous transmission to the driven shaft.

5. Power transmission apparatus as in claim 3 and wherein walls are provided constituting separate channels for the masses, and the thrusting means comprise a vane in each channel operating to force inwardly the mass therein and permit it to return idly outward in its channel.

6. Power transmission apparatus as in claim 3 and wherein the thrusting means comprises a planetating carrier formed with separate annular guiding channels confining the masses, and a series of vanes spaced to operate successively on the respective masses.

7. Power transmission apparatus comprising in combination the rotary driving and driven members, a support revolved by the driving member, a movable device carried bodily on said support, a centrifugal mass consisting of small spheres running in oil, and connections from the driven member to the device, operative by the speed difference of the driving and driven members, for actuating the device; said device acting to thrust the mass inwardly whereby the centrifugal force thereof, continuously resisting such thrusting action, is applied to transmit continuous torque to the driven member.

8. Power transmission apparatus as in claim 3 and wherein the centrifugal masses each consist of small spheres running in oil.

9. Power transmission as in claim 3 and wherein each centrifugal mass comprises a loose aggregation of a multitude of small solid particles.

10. Power transmission apparatus comprising the rotary driving and driven members, a support revolved by the driving member, a planetating device mounted on the support, a connection from the driven member to the device for actuating the device, a loose mass cooperating with the device, and means on the device operating to thrust the mass inward at one side of the planetary path clear to the furthest inward point, where such planetary path intersects the radius connecting the centers of revolution and planetation, and to release it at the other side of such radius to return outward.

In testimony whereof, we have affixed our signatures hereto.

JOHN REECE.
FRANKLIN A. REECE.